(12) United States Patent
Henry et al.

(10) Patent No.: US 9,394,950 B1
(45) Date of Patent: Jul. 19, 2016

(54) SHORT-BEAM NEGATIVE STIFFNESS ELEMENTS

(71) Applicant: HRL LABORATORIES, LLC, Malibu, CA (US)

(72) Inventors: Christopher P. Henry, Thousand Oaks, CA (US); Geoffrey P. McKnight, Los Angeles, CA (US); Sloan P. Smith, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 37 days.

(21) Appl. No.: 14/195,569

(22) Filed: Mar. 3, 2014

Related U.S. Application Data

(60) Provisional application No. 61/778,213, filed on Mar. 12, 2013.

(51) Int. Cl.
- *F16F 1/18* (2006.01)
- *F16D 9/00* (2006.01)
- *F16F 1/32* (2006.01)
- *F16F 3/02* (2006.01)

(52) U.S. Cl.
CPC ... *F16D 9/00* (2013.01); *F16F 1/18* (2013.01); *F16F 1/185* (2013.01); *F16F 1/324* (2013.01); *F16F 3/023* (2013.01)

(58) Field of Classification Search
CPC ............... F16F 1/18; F16F 1/185; F16F 1/22; F16F 1/324; F16F 3/023
USPC .................................................. 267/158–165
See application file for complete search history.

(56) References Cited

U.S. PATENT DOCUMENTS

| | | | | |
|---|---|---|---|---|
| 2,571,170 | A * | 10/1951 | Stilwell, Jr. ..................... 60/529 |
| 3,001,419 | A * | 9/1961 | Hymans et al. ............. 74/574.2 |
| 3,508,020 | A * | 4/1970 | Culver ........................ 200/83 R |
| 5,370,352 | A | 12/1994 | Platus |
| 5,833,204 | A | 11/1998 | Platus et al. |
| 6,983,924 | B2 * | 1/2006 | Howell et al. ................. 251/118 |
| 7,789,378 | B2 * | 9/2010 | Dittmar ........................ 267/160 |
| 8,973,937 | B2 * | 3/2015 | Williams ...................... 280/276 |
| 2005/0151310 | A1 * | 7/2005 | Rodeffer ...................... 267/161 |
| 2011/0209958 | A1 * | 9/2011 | Badre-Alam et al. ........ 188/379 |

OTHER PUBLICATIONS

Alabuzhev et al., "Vibration Protection and Measuring Systems with Quasi-Zero Stiffness," Hemisphere Publishing Corp., 1989, 55 pages.
Kashdan et al., "Design, Fabrication and Evaluation of Negative Stiffness Elements," University of Texas at Austin, 16 pages.
Qiu et al., "A Curved-Beam Bistable Mechanism," Journal of Microelectromechanical Systems, 13(2): 137-146, Apr. 2004.
Wang et al., "Extreme stiffness systems due to negative stiffness elements," Am. J. Phys., 72(1): 40-50, Jan. 2004.

* cited by examiner

*Primary Examiner* — Thomas Irvin
(74) *Attorney, Agent, or Firm* — Lewis Roca Rothgerber Christie LLP

(57) ABSTRACT

A deformable component which is initially flat and which can be caused to buckle by the application of a radially inward preload force, applied using an outer clamp. The deformable component in the buckled configuration then exhibits negative stiffness over a portion of its range of travel, when an axial force is applied. The deformable component may be fabricated from metal sheet, and may take the form of a polygonal central portion and at least two arms extending radially outwards.

23 Claims, 10 Drawing Sheets

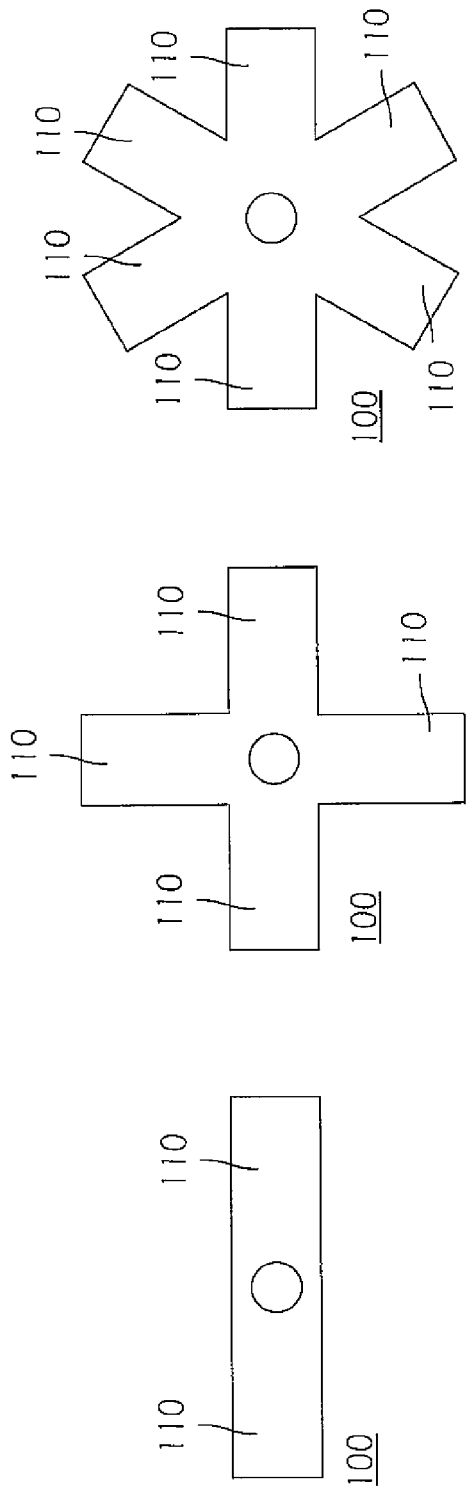
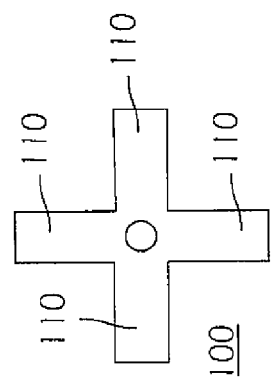
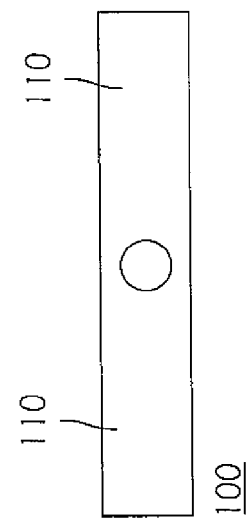
FIG. 2A  FIG. 2B  FIG. 2C  FIG. 2D  FIG. 2E

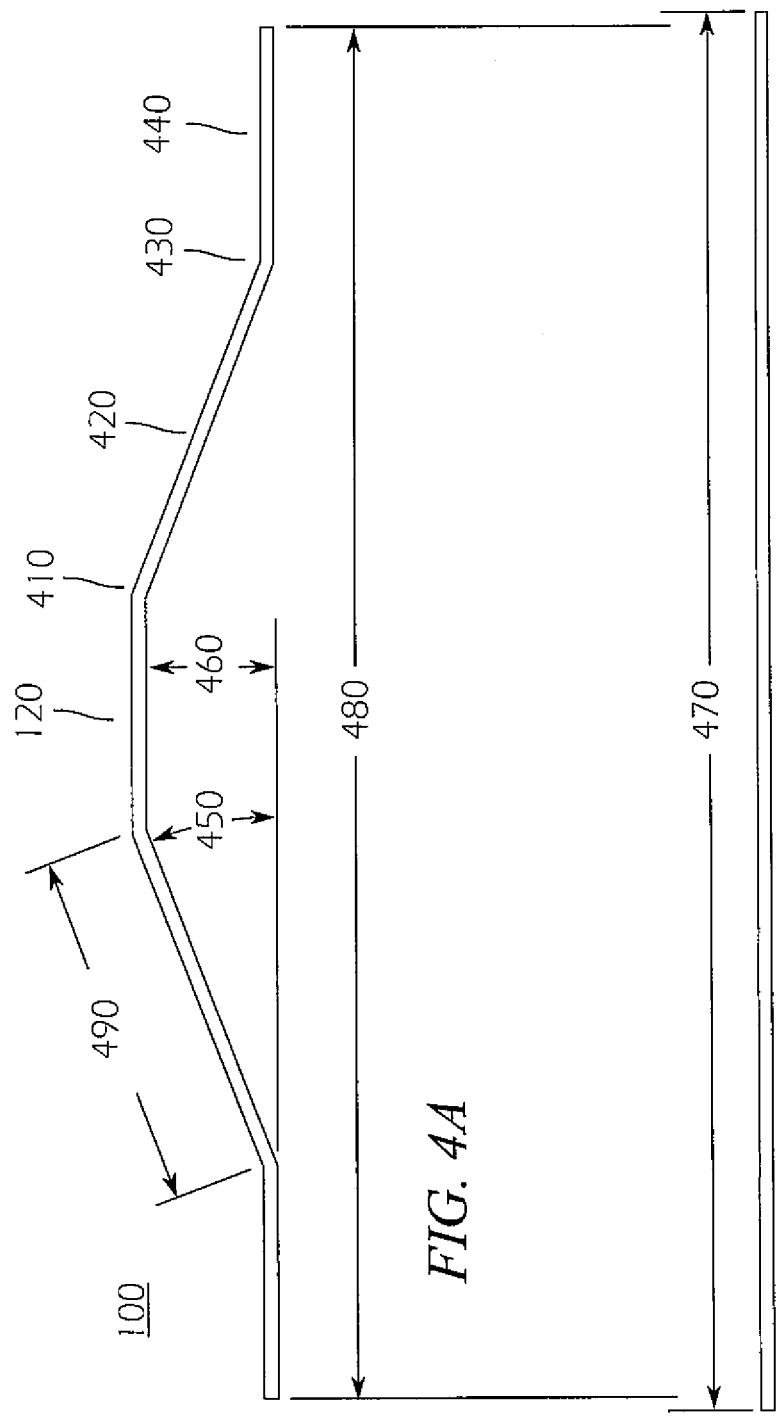

FIG. 5A
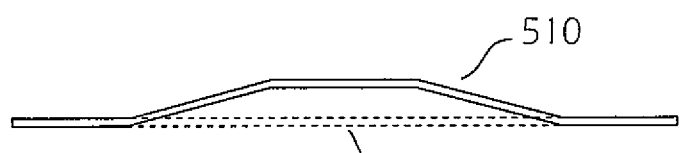
FIG. 5B
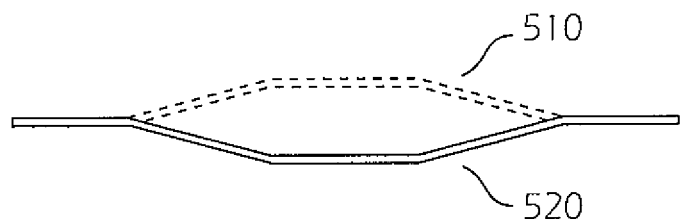
FIG. 5C

SHORT-BEAM NEGATIVE STIFFNESS ELEMENTS

CROSS-REFERENCE TO RELATED APPLICATION(S)

The present application claims priority to and the benefit of Provisional Application No. 61/778,213, filed Mar. 12, 2013, entitled "SHORT-BEAM NEGATIVE STIFFNESS ELEMENTS", the entire content of which is incorporated herein by reference.

STATEMENT REGARDING FEDERALLY SPONSORED RESEARCH OR DEVELOPMENT

This invention was made with U.S. Government support under Contract No. HR0011-10-C-0125 awarded by the Defense Advanced Research Projects Agency (DARPA) Defense Sciences Office. The U.S. Government has certain rights to this invention.

FIELD

The present invention relates to mechanical elements demonstrating negative stiffness and more particularly to stackable elements demonstrating large values of negative stiffness.

BACKGROUND

Mechanical elements with negative stiffness may be used in the design of mechanical isolation systems, in which they may be combined with elements having positive stiffness to result in an assembly with low stiffness. In another application, a negative stiffness element may be employed as a resettable mechanical fuse, which, when subjected to a force exceeding a predetermined threshold, gives way, thereby preventing the force from exceeding the threshold. Such a fuse may be used to protect a sensitive mechanical system from shock forces exceeding this threshold.

Although certain designs for negative stiffness elements are known in the art, they are generally large, complex, and capable of providing relatively low values of negative stiffness. In particular, the specific negative stiffness, i.e., the maximum negative stiffness per unit volume or per unit mass, is typically low. This makes these designs inconvenient or difficult to use for providing, for example, shock protection in a small volume. Moreover, existing designs are typically complex structures several of which cannot readily be combined to form a single compound structure with a larger value of negative stiffness.

Thus, there is a need for a compact, stackable negative stiffness element providing a large negative stiffness.

SUMMARY

The present invention relates to a negative stiffness element that includes a deformable component which is initially flat and which can be caused to buckle by the application of a radially inward preload force, applied using an outer clamp. The deformable component in the buckled configuration then exhibits negative stiffness over a portion of its axial range of travel.

According to an embodiment of the present invention there is provided a negative stiffness element, including: a plurality of deformable components arranged in a stack, each of the plurality of deformable components, including: a polygonal central portion having a central through hole, and a plurality of arms extending radially outward from the central portion, the arms having substantially identical length with each other, each of the arms having a ratio of length to thickness greater than 10 and less than 30, the polygonal central portion and the plurality of arms having a substantially identical uniform thickness, and the polygonal central portion and the plurality of arms being composed of an identical high elasticity material; and an outer clamp for applying a compressive preload radially inward on each of the arms of each of the plurality of deformable components.

In one embodiment, each of the plurality of deformable components is composed of a material selected from the group consisting of hardened, high strength metal alloys, titanium, aluminum, fiber-reinforced composites, polymers, ceramics, and combinations thereof.

In one embodiment, each of the plurality of deformable components is composed of a high strength metal alloy selected from the group consisting of 1095 spring tempered steel, 440C stainless steel, and UNS S32760 super duplex stainless steel.

In one embodiment, the number of arms of each of the plurality of deformable components is selected from the group consisting of two, four, six, and eight.

In one embodiment, each of the arms of each of the plurality of deformable components includes an inner flexing portion, and a rotating portion.

In one embodiment, each of the arms of each of the plurality of deformable components further includes an outer flexing portion and a fixed portion.

In one embodiment, the fixed portion of each of the arms of each of the plurality of deformable components is secured to the outer clamp so as to be substantially immovable with respect to the outer clamp.

In one embodiment, the fixed portion of each of the arms of each of the plurality of deformable components is secured by clamping.

In one embodiment, the fixed portion of each of the arms of each of the plurality of deformable components is secured by a process selected from the group consisting of soldering, brazing, welding, and combinations thereof.

In one embodiment, each of the arms of each of the plurality of deformable components has an outer end secured to the outer clamp in a manner providing a pinned boundary condition at the connection between the outer end of the arm and the outer clamp.

In one embodiment, the outer end of each of the arms of each of the plurality of deformable components is secured to the outer clamp by being pressed, by the compressive preload, into a notch in the outer clamp.

In one embodiment, at least one arm has a rounded end.

In one embodiment, at least one arm has a crescent-shaped end.

In one embodiment the negative stiffness element further includes an inner clamp, the inner clamp including a lower inner clamping portion, an upper inner clamping portion, and a through-rod, wherein the through-rod passes through an inter-arm gap between two of the arms.

In one embodiment, the negative stiffness element further includes a central shaft substantially perpendicular to the central portion of the deformable component, the shaft penetrating the through hole and secured to each of the plurality of deformable components.

In one embodiment, the negative stiffness element further includes an inner clamp, and the central portion of the deformable component is secured to the central shaft by the inner clamp.

In one embodiment, the inner clamp includes two clamping blocks secured to the central shaft, and wherein the central portion of the deformable component is clamped between the two clamping blocks.

In one embodiment, the outer clamp includes two clamping sections and a plurality of threaded fasteners configured to adjust the compressive preload.

In one embodiment, the outer clamp includes an upper clamping section, a lower clamping section, and a plurality of threaded fasteners.

In one embodiment, the negative stiffness element of includes a shim to adjust the compressive preload on the deformable component.

In one embodiment, the negative stiffness element further includes a spacer between at least one pair of adjacent deformable components.

In one embodiment, the negative stiffness element further includes a layer of viscoelastic material between at least one pair of adjacent deformable components.

According to an embodiment of the present invention there is provided a deformable component for use in a negative stiffness element, the component including: a polygonal central portion having a central through hole; and a plurality of arms extending radially outward from the central portion, the arms having substantially identical length with each other, each arm having a ratio of length to thickness greater than 10 and less than 30, the polygonal central portion and the plurality of arms having a substantially identical uniform thickness, and the polygonal central portion and the plurality of arms being composed of an identical high elasticity material.

BRIEF DESCRIPTION OF THE DRAWINGS

These and other features and advantages of the present invention will become appreciated as the same become better understood with reference to the specification, claims and appended drawings wherein:

FIG. 2A is a top view of a deformable component with two arms according to an embodiment of the present invention;

FIG. 2B is a top view of a deformable component with four arms according to an embodiment of the present invention;

FIG. 2C is a top view of a deformable component with six arms according to an embodiment of the present invention;

FIG. 2D is a top view of a deformable component with two arms, and with dimensions differing from those of FIG. 2A, according to an embodiment of the present invention;

FIG. 2E is a top view of a deformable component with four arms, and with dimensions differing from those of FIG. 2B, according to an embodiment of the present invention;

FIG. 4A is a schematic side view of a deformable component' in the buckled shape according to an embodiment of the present invention;

FIG. 4B is a schematic side view of a deformable component in the undeformed flat shape according to an embodiment of the present invention;

FIG. 5A is a schematic side view of a deformable component in the undeformed flat shape according to an embodiment of the present invention;

FIG. 5B is a schematic side view of a deformable component in the upper stable state according to an embodiment of the present invention;

FIG. 5C is a schematic side view of a deformable component in the lower stable state according to an embodiment of the present invention;

DETAILED DESCRIPTION

The detailed description set forth below in connection with the appended drawings is intended as a description of the presently preferred embodiments of a short-beam negative stiffness element provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
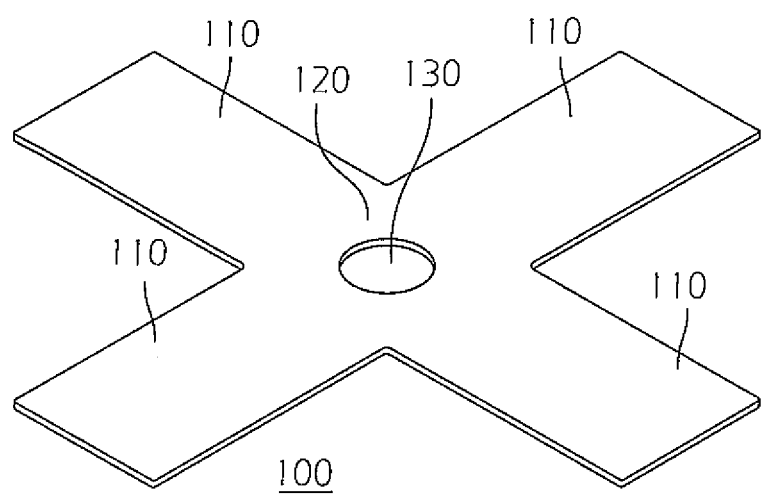
FIG. 1 is a perspective view of a deformable component with four arms according to an embodiment of the present invention.

Referring to FIG. 1, a negative stiffness element (NSE) may constructed using a flat part, referred to herein as a deformable component 100, having two or more arms 110 in a rotationally symmetric arrangement, joined at a central portion 120 having a central through hole 130. The number of rotationally symmetric arms 110 of the deformable component 100 as well as the arms' length, width and material thicknesses may be varied in order to produce tailored stiffness and displacement characteristics. In one embodiment, the deformable component 100 is made of hardened, high strength metal alloys, such as 1095 spring tempered steel and 440C stainless steel, but another material may be used if it can be formed to the shape of the deformable component 100. Such materials may include, without limitation, titanium, aluminum, composites, polymers, and ceramics. Suitable materials may have high strength and stiffness. These materials may be difficult to machine using traditional milling machines; other fabrication processes, including laser cutting or chemical etching, however, may be suitable for use with such materials. Water jet cutting or abrasion may also be used.

Several shapes which may be used for the deformable component 100 are illustrated in FIGS. 2A-2E. These include a configuration with two arms (FIG. 2A), one with four arms (FIG. 2B) and one with six arms (FIG. 2C), and alternate geometries for the two-arm and four-arm configurations, having different overall size and proportions (FIGS. 2D and 2E, respectively). Other numbers of arms, such as three, five, seven, or eight, are also possible. The selection of a shape for the conformable element may affect the characteristics of a negative stiffness element constructed using the deformable component 100.

Figure 3:
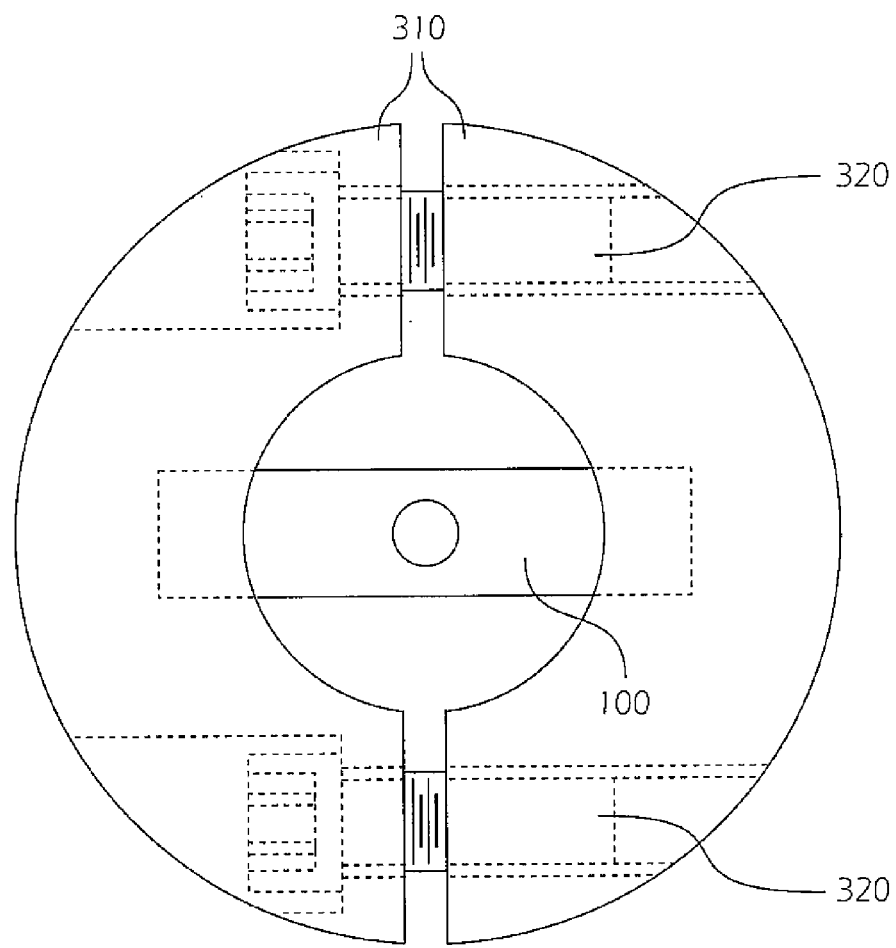
FIG. 3 is a top view of a negative stiffness element with a clamp to provide a radial preload according to an embodiment of the present invention.

Referring to FIG. 3, a clamping device referred to as an outer clamp 310 may be used to apply a force, referred to as a preload force, radially inwards on the ends of the arms 110 of the deformable component 100. In the embodiment illustrated in FIG. 3, which is suitable for use with a deformable component 100 having two arms 110 this may be accomplished using an outer clamp 310 composed of two parts, each part bearing against the end of one of the two arms 110 of the deformable component 100, and the two parts being drawn together by two bolts referred to as preload bolts 320. In the embodiment of FIG. 3, the external axial load is applied normal to the view of FIG. 3, i.e., out of the paper.

Shims may also be used between the outer clamp 310 and the ends of the arms 110. The use of shims may be especially convenient if a deformable component 100 with more than two arms 110 is used, or if a clamp lacking a mechanism for adjusting the preload, such as preload bolts 320, is used. In such an embodiment a shim may be used at the end of each arm 110, and the shims may be selected to compensate for any fabrication imperfections in the lengths of the arms 110 or for fabrication imperfections in the outer clamp 310 which otherwise might result in a non-uniform application of preload.

Referring to FIGS. 4A and 4B, the effect of the preload force may be to cause the originally flat deformable component 100 to deform out of plane so that in a side view it resembles the buckled shape of FIG. 4A. A side view of the undeformed flat shape is shown for reference in FIG. 4B.

The deformable component 100 may be clamped or otherwise reinforced over parts of its surface in a manner for preventing it from bending at those parts of its surface. For example, the central portion 120, and the fixed portion 440 of each arm 110, may be constrained to remain flat during the application of the preload force. Indeed, to prevent the negative stiffness element from deforming into an undesired shape, it is helpful to force the central portion 120 of the negative stiffness element to remain flat out to the beginning of the arm section, and to constrain this flat section against any bending or rotation. This may be accomplished by constraining the central portion 120 to a central shaft that passes through the central through hole 130. This shaft may also serve to apply the axial force to the negative stiffness element. Constraining the negative stiffness element to the shaft can be accomplished by using a compression clamp fixture or by brazing or welding.

When constrained in this manner, each arm 110 of the deformable component 100 may tend to bend primarily at an inner flexing portion 410 and an outer flexing portion 430, and the rotating portion 420 between the inner flexing portion 410 and the outer flexing portion 430 may rotate, so that the deformable component 100 assumes the buckled shape of FIG. 4A.

By buckling out of plane, the length of the deformable component 100 is reduced by an amount referred to as the lateral compression distance, i.e., the difference between the original length 470 and the preloaded length 480 of the negative stiffness element. As illustrated in FIG. 4A the amount of buckling induced by the preload force may be quantified by the buckle height 460 or by the arm angle 450.

Referring to FIGS. 5A, 5B and 5C, once the negative stiffness element has been preloaded to cause it to buckle from the shape of FIG. 5A to, for example, the upper stable state 510 illustrated in FIG. 5B, an axial force may be applied along the central axis. As a single negative stiffness element is displaced from one stable position to another, it has an axial stiffness given approximately by $$K_{NSE} = \frac{N \sin(\theta) E_{arm} A_{arm}}{L_{arm}},$$

where N is the number of arms 110, and $E_{arm}$, $A_{arm}$, and $L_{arm}$, are the Young's modulus, the cross sectional area, and the effective arm length 490 (see FIG. 4A), respectively. As the negative stiffness element is deformed, by the application of an axial force, towards the unstable flat position 515, the force resisting this deformation decreases until the negative stiffness element is in the unstable flat position 515, at which point the force is reduced to zero. Further deformation towards the lower stable position illustrated in FIG. 5C results in a force in the direction tending to increase the deformation. In particular, if the axial force is provided by a mechanism capable of applying a force only in compression, such as a push rod, or by a mechanism capable of applying a force only in tension, such as a cable, then as the negative stiffness element is deformed gradually downwards from the upper stable state 510, the axial force on the deformable component 100 will decrease until the deformation reaches the unstable flat position 515, and when the deformation advances past the unstable flat position 515, the deformable component 100 will snap abruptly to the lower stable state 520.

Figure 6:
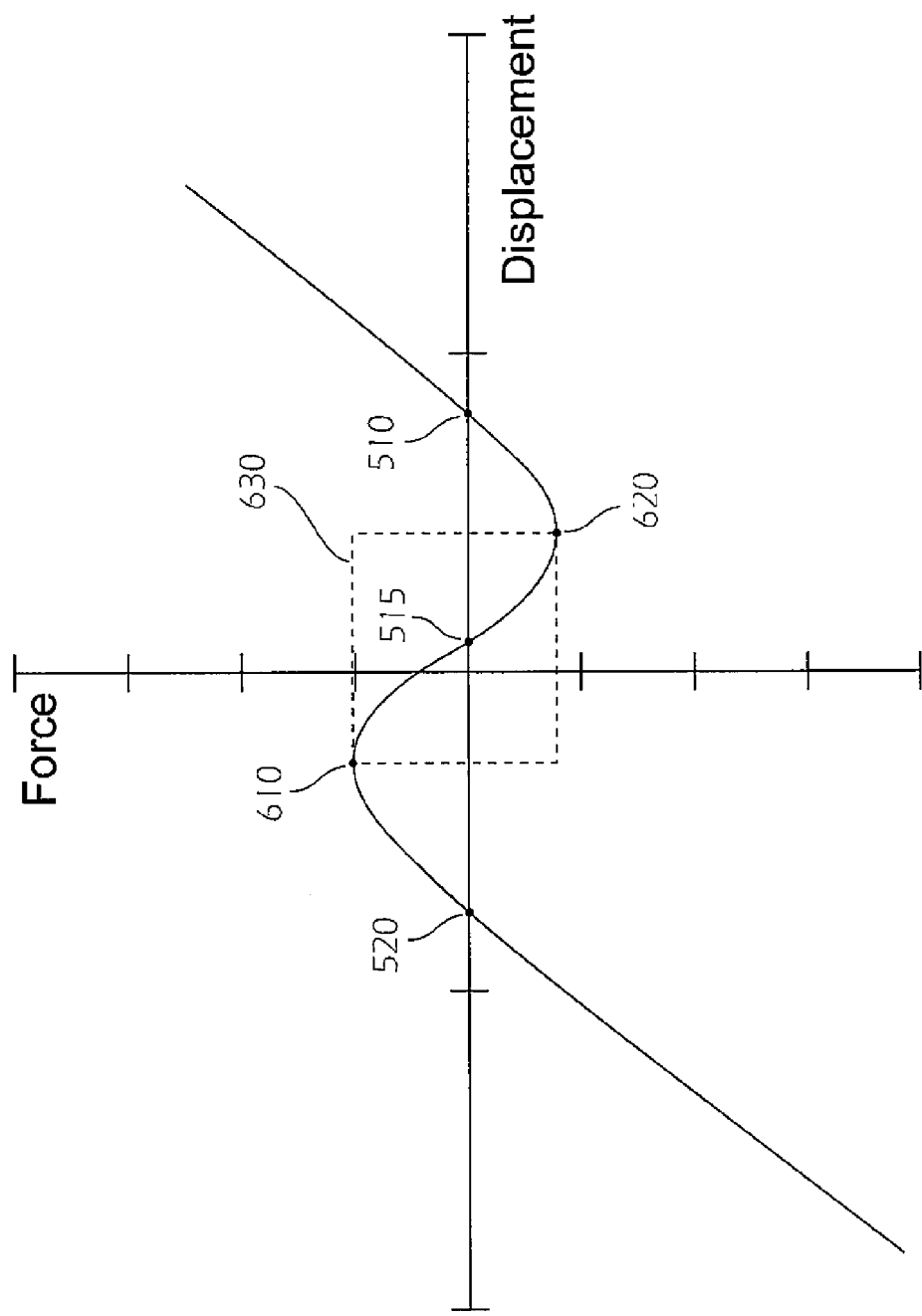
FIG. 6 is a graph of force vs. displacement for a negative stiffness element according to an embodiment of the present invention.

Referring to FIG. 6, the applied force vs. displacement curve for a negative stiffness element illustrates this behavior. Assuming that the upwards direction in, e.g., FIGS. 5B and 5C is chosen to be positive, then the force applied to the deformable component 100 is zero and the stiffness (the rate of change of force with displacement) is positive at the lower stable state 520. If the negative stiffness element is deformed further downwards, a downwards (negative) force is required. If the negative stiffness element is deformed upwards, then an upwards (positive) force is required. In this direction, the force increases, although at a decreasing rate, to the lower transition point 610 between positive and negative stiffness; at this point the force is positive but no longer increasing. With continued upward deformation the force decreases until it reaches zero at the unstable flat position 515. In the negative stiffness region 630 between the lower transition point 610 and the upper transition point 620, the stiffness, i.e., the rate of change of force with displacement, is negative, as illustrated in FIG. 6.

Referring again to FIGS. 4A and 4B, in one embodiment, the arm angle 450 is between 3 degrees and 7 degrees. If the dimensions, configuration, and material of the deformable component 100, and the preload force, are chosen so as to produce an arm angle 450 that is too great, e.g., significantly greater than 7 degrees, then an applied axial force may produce buckling in other, undesired modes of deformation, or inelastic deformation of the deformable component 100, or both. If the dimensions, configuration, and material of the deformable component 100, and the preload force, are chosen so as to produce an arm angle 450 that is too small, e.g., less than 3 degrees, then the negative stiffness element may exhibit little or no negative stiffness.

The aspect ratio of each arm 110, i.e., the ratio of the effective arm length 490 to the thickness of the arm 110 may also be critical to the behavior of the negative stiffness element. To produce negative stiffness behavior, the aspect ratio may be between 8 and 30, and may, in one embodiment, be chosen to be approximately 25.

Figure 7A:
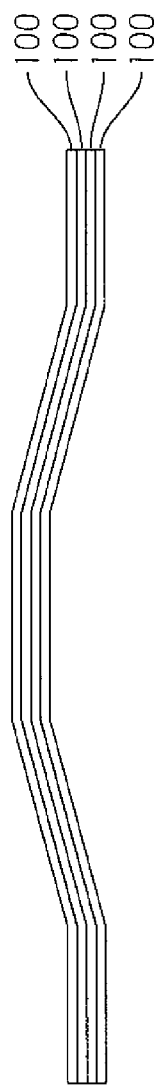
FIG. 7A is a schematic side view of multiple stacked deformable components according to an embodiment of the present invention.
Figure 7B:
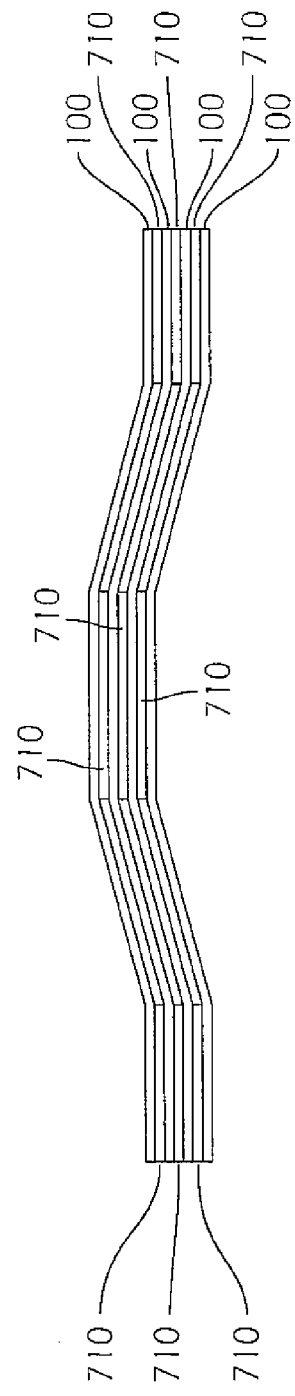
FIG. 7B is a schematic side view of multiple deformable components stacked with spacers inserted between adjacent deformable components, over a portion of the surface of the deformable components, according to an embodiment of the present invention.
Figure 7C:
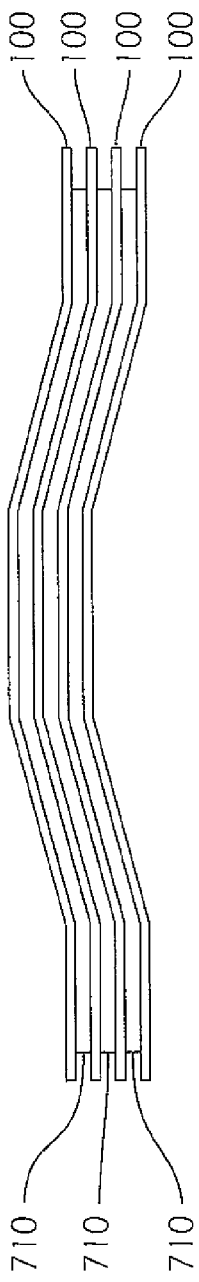
FIG. 7C is a schematic side view of multiple deformable components stacked with spacers inserted between adjacent deformable components according to an embodiment of the present invention.

Deformable components 100 constructed according to embodiments of this invention may be stacked to create a composite structure with a higher negative stiffness value or other desirable properties. Referring to FIGS. 7A-7C, multiple deformable components 100 may for example be stacked directly in contact with each other (FIG. 7A), or with spacers 710 between adjacent deformable components 100, either over a portion of the area of the deformable components 100 (FIG. 7B) or over the entire area or nearly the entire area (FIG. 7C). In the embodiment illustrated in FIG. 7C, the portions of the spacers 710 adjacent to the inner flexing portions 410, the outer flexing portions 430, and the rotating portions 420 (see FIG. 4A) of the deformable components 100 between which they are placed will deform in shear as the deformable components 100 are deformed axially; in such an embodiment spacers 710 made of a viscoelastic material, for example, may provide damping. The spacers 710 may be bonded, e.g., by adhesive, to the deformable components 100. As is known to those of skill in the art, a viscoelastic material is one with an appreciable mechanical loss tangent, and in embodiments of the present invention may include for example rubbers, rubbery polymers, soft metals such as indium-tin alloy, and plastics, such as poly(ester urethane) (PESU). Spacers 710 in the configuration illustrated in FIG. 7B may prevent the surfaces of the rotating portions 420 of adjacent deformable components 100 from being in contact (as they may be in the embodiment of FIG. 7A), and may thereby prevent friction, or contact between surface irregularities, from causing poorly controlled behavior.

Figure 8A:
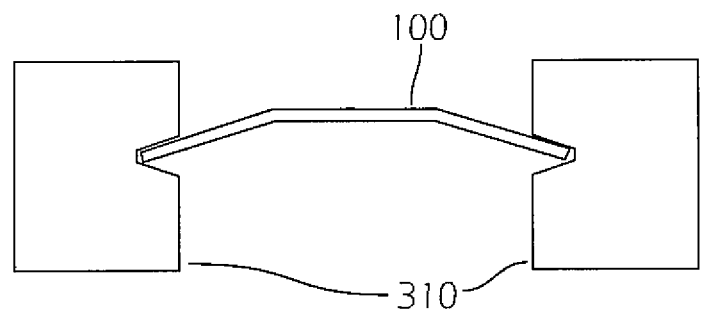
FIG. 8A is a schematic side view of a negative stiffness element with pinned boundary conditions at the ends of the arms.
Figure 8B:
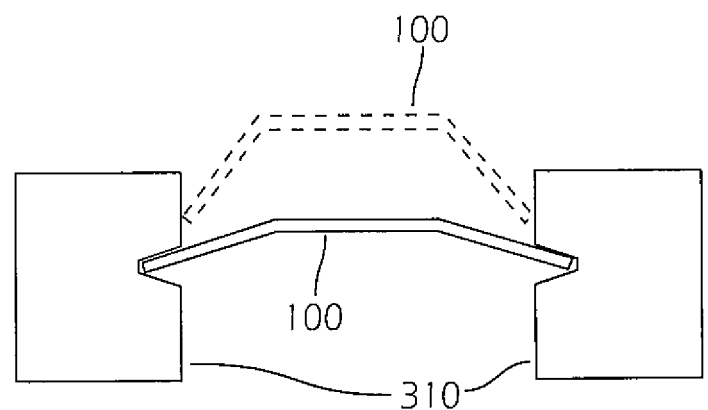
FIG. 8B is a schematic side view of a negative stiffness element with pinned boundary conditions at the ends of the arms, and of the negative stiffness element pulled out of notches providing the pinned boundary conditions.

The interface between an arm 110 of a deformable component 100 and the outer clamp 310 (see FIG. 3) determines the boundary conditions for deformation of the deformable component 100 at the outer flexing portions 430 of the arms 110. For example, referring to FIG. 8A, pinned boundary conditions may be provided by using an outer clamp 310 with a notch for the end of each arm 110, thereby permitting the rotating portion 420 of each arm 110 to pivot about the end in the notch while the inner flexing portion 410 flexes. In such an embodiment, the clamp imposes no moment (i.e., no force to twist or rotate) on the pinned end of the arm 110, which is constrained within the notch. Moreover, in this case, the arms have neither a fixed portion 440 nor an outer flexing portion 430. Referring to FIG. 8B, an embodiment in which the ends of the arms 110 are constrained within notches may have a tendency to pull out of the notches, as shown by the dashed outline, if, for example, in the upper stable state 510 an additional upwards axial force is applied. In applications in which this behavior is undesirable, it may be necessary to design additional mechanical stops into the system to prevent the deformable component 100 from being pulled out of the notches.

Figure 8C:
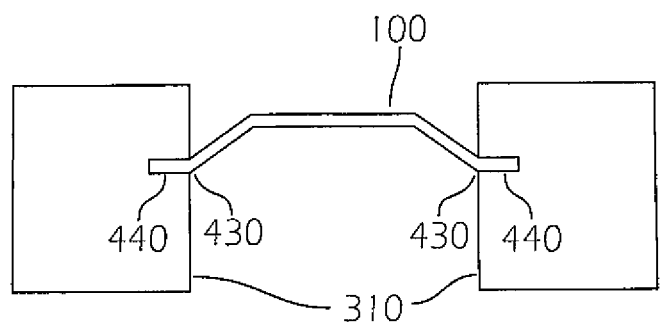
FIG. 8C is a schematic side view of a negative stiffness element with fixed boundary conditions at the ends of the arms.

In another embodiment, fixed boundary conditions may be provided by clamping the arms 110 as illustrated in FIG. 8C. In this embodiment the clamped portions of the arms 110 become the fixed portions 440 of the deformable component 100, and the clamp imposes a moment on each arm 110, and also protects (e.g., prevents) the deformable component 100 from being pulled out of the clamp. The use of fixed boundary conditions provides a shorter effective arm length 490 than pinned boundary conditions would, if employing the same deformable component 100. In other embodiments fixed boundary conditions may be achieved by methods other than clamping, including soldering, brazing, or welding.

Figure 9A:
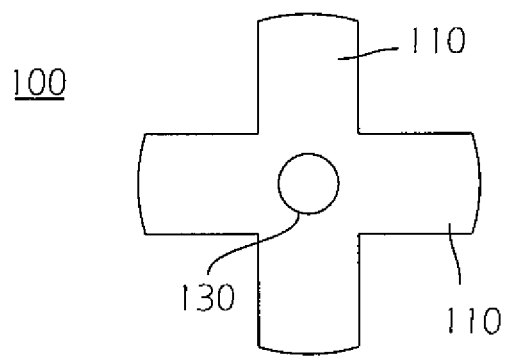
FIG. 9A is a top view of a deformable component with four arms having rounded ends, according to an embodiment of the present invention.
Figure 9B:
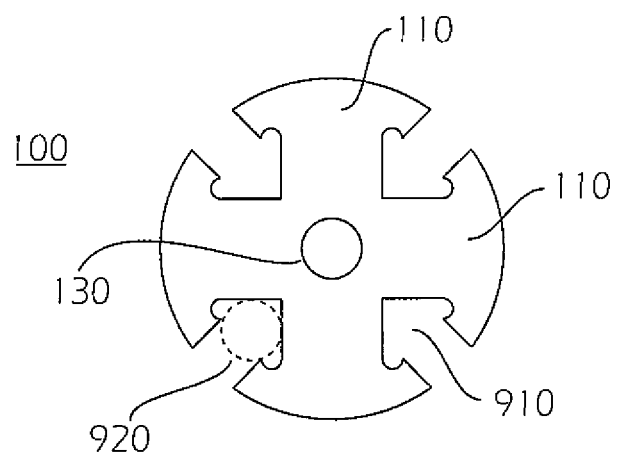
FIG. 9B is a top view of a deformable component with four arms having crescent-shaped ends, according to an embodiment of the present invention.

Referring to FIG. 9A, it may be advantageous for the arms 110 of the deformable component 100 to be rounded to more effectively engage a round recess or aperture in the outer clamp. For deformable components 100 with more than two arms 110, preload may be applied by pressing the deformable component into a cylindrical upper clamping section having a cylindrical hole with an inner diameter slightly smaller than the outer diameter of the deformable component 100, defined by the ends of the arms 110. The deformable component may be held in place by a clamping force between the upper clamping section and a lower clamping section, which may include a cylindrical portion extending into the hole in the upper clamping section; the upper clamping section and the lower clamping section may be secured together by threaded fasteners. It may be advantageous for the arms 110 of the deformable component to be symmetric, i.e., spaced evenly in angle around the center of the deformable component; such a design may reduce the likelihood that the deformable component, when subjected to preload or to axial loads, will deform in a mode that is not cylindrically symmetric, with, e.g., some arms 110 deforming more, or in a different direction, than other arms 110. Referring to FIG. 9B, the arms 110 may also have crescent-shaped ends to provide additional strength and clamping area, allowing the arms to be clamped more securely in the outer clamp. The gap between adjacent arms, or inter-arm gap 910, may also accommodate a through-rod 920, which may supplement a through-rod passing through the central through hole 130. In FIG. 9B, a through-rod 920 is shown as a dashed outline in only one of the inter-arm gaps 910; through-rods 920 may however be used in all of the inter-arm gaps 910 and in the central through hole 130.

Figure 10:
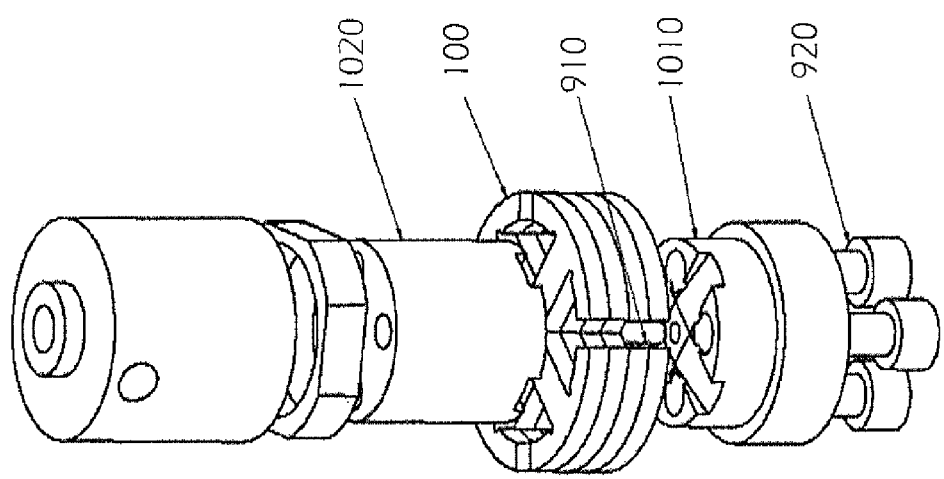
FIG. 10 is a perspective exploded view of a stack of deformable components, with lower and upper inner clamping portions, and through-rods, according to an embodiment of the present invention.

Referring to FIG. 10, in one embodiment the through-rods 920 are socket-head bolts which, when the negative stiffness element is assembled, pass through a lower inner clamping portion 1010 and through the inter-arm gaps 910 in the deformable components 100, and are secured in an upper inner clamping portion 1020. The lower inner clamping portion 1010 and the upper inner clamping portion 1020 together form an inner clamp which sandwiches, and thereby secures, the central portion 120 of a deformable component 100 or the central portions 120 of the deformable components 100 in a stack of deformable components 100. The inner clamp may be used to transmit an external, axial force to the central portion 120 of a deformable component 100 or the central portions 120 of the deformable components 100 in a stack of deformable components 100.

Other design considerations may also affect the behavior of the negative stiffness element. Increasing the number of arms 110 will result in a negative stiffness element that is volumetrically more efficient, i.e., a negative stiffness element that provides a larger maximum negative stiffness value in a given volume. Negative stiffness elements with more than two arms 110 carry additional challenges, however. For example, the fabrication tolerances in such a negative stiffness element must be fairly precise to provide the correct preload to each arm 110, and to provide balance and symmetry to prevent the arms 110 from twisting. The width of the arm 110 is another design parameter that can be varied. The maximum negative stiffness value achievable is approximately proportional to the width of the arms 110. Arms 110 that are too narrow may be more vulnerable to twisting under stress, and in one embodiment the width of each arm 110 is at least five times its thickness.

Although limited embodiments of short-beam negative stiffness elements have been specifically described and illustrated herein, many modifications and variations will be apparent to those skilled in the art. Accordingly, it is to be understood that short-beam negative stiffness elements constructed according to principles of this invention may be embodied other than as specifically described herein. The invention is also defined in the following claims, and equivalents thereof.

What is claimed is:

1. A negative stiffness element, comprising:
    a plurality of deformable components arranged in a stack, each of the plurality of deformable components comprising:
        a polygonal central portion having a central through hole; and
        a plurality of arms extending radially outward from the central portion,
        the arms having substantially identical length with each other,
        each of the arms having a ratio of length to thickness greater than 10 and less than 30,
        the polygonal central portion and the plurality of arms having a substantially identical uniform thickness, and
        the polygonal central portion and the plurality of arms being composed of an identical high elasticity material; and
    an outer clamp, each of the arms of each of the plurality of deformable components being compressively preloaded radially inward by the outer clamp.

2. The negative stiffness element of claim 1, wherein each of the plurality of deformable components is composed of a material selected from the group consisting of hardened high strength metal alloys, titanium, aluminum, fiber-reinforced composites, polymers, ceramics, and combinations thereof.

3. The negative stiffness element of claim 1, wherein each of the plurality of deformable components is composed of a high strength metal alloy selected from the group consisting of 1095 spring tempered steel, 440C stainless steel, and UNS S32760 super duplex stainless steel.

4. The negative stiffness element of claim 1, wherein the number of arms of each of the plurality of deformable components is selected from the group consisting of two, four, six, and eight.

5. The negative stiffness element of claim 1, wherein each of the arms of each of the plurality of deformable components comprises an inner flexing portion, and a rotating portion.

6. The negative stiffness element of claim 5, wherein each of the arms of each of the plurality of deformable components further comprises an outer flexing portion and a fixed portion.

7. The negative stiffness element of claim 6, wherein the fixed portion of each of the arms of each of the plurality of deformable components is secured to the outer clamp so as to be substantially immovable with respect to the outer clamp.

8. The negative stiffness element of claim 7, wherein the fixed portion of each of the arms of each of the plurality of deformable components is secured by clamping.

9. The negative stiffness element of claim 7, wherein the fixed portion of each of the arms of each of the plurality of deformable components is secured by a process selected from the group consisting of soldering, brazing, welding, and combinations thereof.

10. The negative stiffness element of claim 6, wherein each of the arms of each of the plurality of deformable components has an outer end secured to the outer clamp in a manner providing a pinned boundary condition at a connection between the outer end of the arm and the outer clamp.

11. The negative stiffness element of claim 10, wherein the outer end of each of the arms of each of the plurality of deformable components is secured to the outer clamp by being pressed, by the compressive preload, into a notch in the outer clamp.

12. The negative stiffness element of claim 1, wherein at least one arm has a rounded end.

13. The negative stiffness element of claim 1, wherein at least one arm has a crescent-shaped end.

14. The negative stiffness element of claim 1, further comprising an inner clamp, the inner clamp comprising a lower inner clamping portion, an upper inner clamping portion, and a through-rod, wherein the through-rod passes through an inter-arm gap between two of the arms.

15. The negative stiffness element of claim 1, further comprising a central shaft substantially perpendicular to the central portion of the deformable component, the shaft penetrating the through hole and secured to each of the plurality of deformable components.

16. The negative stiffness element of claim 15, further comprising an inner clamp, wherein the central portion of the deformable component is secured to the central shaft by the inner clamp.

17. The negative stiffness element of claim 16, wherein the inner clamp comprises two clamping blocks secured to the central shaft, and wherein the central portion of the deformable component is clamped between the two clamping blocks.

18. The negative stiffness element of claim 1, wherein the outer clamp comprises two clamping sections and a plurality of threaded fasteners configured to adjust the compressive preload.

19. The negative stiffness element of claim 1, wherein the outer clamp comprises an upper clamping section, a lower clamping section, and a plurality of threaded fasteners.

20. The negative stiffness element of claim 19, further comprising a shim to adjust the compressive preload on the deformable component.

21. The negative stiffness element of claim 1, further comprising a spacer between at least one pair of adjacent deformable components.

22. The negative stiffness element of claim 1, further comprising a layer of viscoelastic material between at least one pair of adjacent deformable components.

23. A negative stiffness element, comprising:
    a deformable component, the component comprising:
        a polygonal central portion having a central through hole; and
        a plurality of arms extending radially outward from the central portion,
        the arms having substantially identical length with each other,
        each arm having a ratio of length to thickness greater than 10 and less than 30,
        the polygonal central portion and the plurality of arms having a substantially identical uniform thickness, and
        the polygonal central portion and the plurality of arms being composed of an identical high elasticity material; and
    an outer clamp, each of the arms of the deformable component being compressively preloaded radially inward by the outer clamp.

* * * * *